Oct. 31, 1950      P. D. HESS      2,527,550

DEFLECTION SCOPE

Filed May 8, 1946      2 Sheets-Sheet 1

*INVENTOR.*
PAUL D. HESS

BY

*Attorney*

Oct. 31, 1950     P. D. HESS     2,527,550
DEFLECTION SCOPE

Filed May 8, 1946     2 Sheets-Sheet 2

INVENTOR.
PAUL D. HESS
BY
Attorney

Patented Oct. 31, 1950

2,527,550

UNITED STATES PATENT OFFICE 2,527,550

DEFLECTION SCOPE

Paul D. Hess, Glasford, Ill.

Application May 8, 1946, Serial No. 668,053

7 Claims. (Cl. 250—27.5)

(Granted under the act of March 3, 1883, as amended April 30, 1928; 370 O. G. 757)

My invention relates to an electronic device of cathode ray tube type for measuring mechanical displacement.

It has been the practice in this art to vary the deflection of an electron beam or the movement of the target electrode or target plate relative to the cathode (along the tube's longitudinal axis), in accordance with applied mechanical force. The electron beam was deflected by magnetic or electrostatic means. In one method, a mechanical force caused a magnet to move relative to the electron beam, thereby deflecting the beam and causing a deflection of the meter in the recording circuit. The disadvantages with this method are the added weight of the equipment, the need for a power supply, and the fact that it would not be useful for measuring displacements associated with the higher frequencies of motion. The disadvantage with the method of moving the plate relative to the cathode along the tube's longitudinal axis, is much less displacement sensitivity, since a large movement of the plate toward the cathode will change the effective plate-to-cathode resistance only slightly and thus cause only a slight deflection on the meter.

My invention eliminates any added weight, is useful for measuring displacements associated with higher frequencies of motion, and has a greater displacement sensitivity, since a very small movement of the plate (made of a resistance material) will cause a considerable indication on the meter.

In accordance with my invention, an element of a cathode-emission tube is moved in accordance with applied mechanical force so as to effect an indication in the connected recording circuit.

Further in accordance with my invention, the element being moved may be so constructed that a non-linear mechanical displacement would be recorded as a linear quantity.

My invention further resides in systems having features hereinafter described and claimed.

For an understanding of my invention and for illustration of examples thereof, reference is made to the accompanying drawings, in which.

Figure 6:
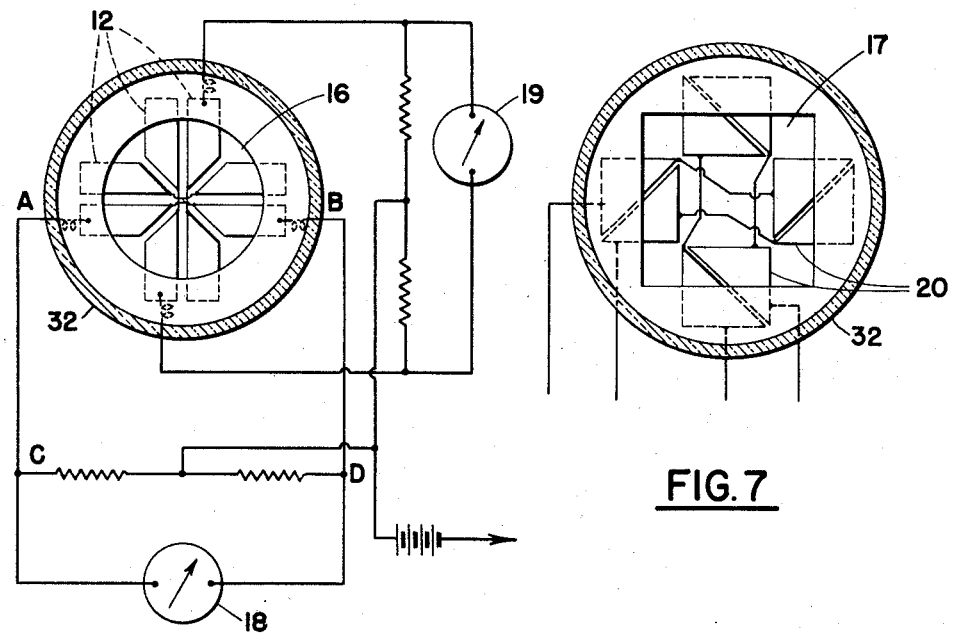
Figure 6 is also a sectional view, showing plate shape, its connections, and the recording circuit designed to measure any displacement in a plane in its $x$ and $y$ components.
Figure 5:
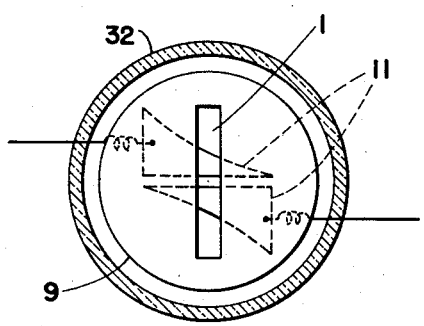
Figure 5 is a sectional view of a tube similar to Figure 4, except the plate is of a non-linear shape.

Figure 7 combines features of Figures 5 and 6, designed to measure non-linear displacements in any direction in a plane in its $x$ and $y$ components and in a linear form.

Figure 8:
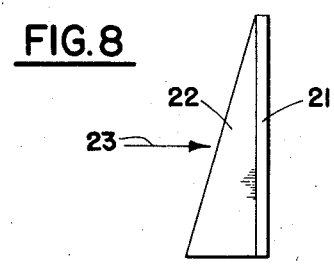

Figure 8 is a side view of a modified target electrode showing the plate and non-linearly coated resistance material.

Figure 1:
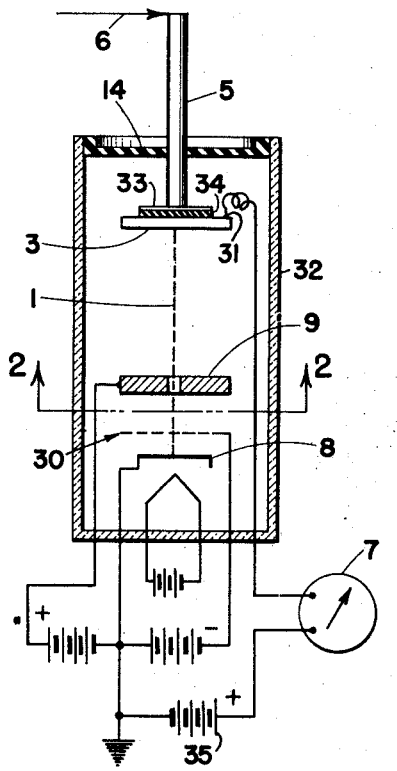
Figure 1 is a cross-sectional elevation view of a cathode ray type tube, connected to a meter circuit.

There is shown in Fig. 1 an electron gun 30 comprising a cathode 8 and a focusing anode 9 and producing an electron beam 1 directed to impinge on a target electrode 3, which target electrode comprises a highly resistive material having an electrical connection 31 thereto normally displaced from the point of impingement of the electron beam 1 on the target electrode 3.

The electron gun 30 which may be similar to those employed in conventional cathode ray tubes, and the target electrode 3 are mounted in an evacuated envelope 32 of glass or metal provided with a flexible diaphragm 14 having the rod 5 sealed therethrough. The rod 5 is positioned in the envelope 32 opposite the electron gun and is provided at its inner end with a support 33 to which the target electrode 3 is secured by the insulation 34. Since the rod 5 extends through the envelope 32, movement of the outer end of the rod will cause corresponding movement of the target electrode 3 within the vacuum chamber within the envelope 32.

The target electrode 3 is positively charged with respect to the cathode 8 by the battery 35 through the meter 7. Movement of the outer end of the rod 5 by the force 6 will move the target electrode 3 relative to the electron beam 1 in such a direction as to move the point of impingement nearer the connection 31 so as to decrease the resistance of the circuit and to thereby increase the current conducted through the electron beam 1. The change in the indication of the meter 7 will therefore be directly proportional to the movement of the target electrode 3.

Figure 2:
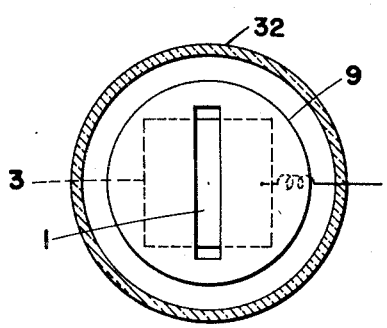
Figure 2 is a sectional view of the tube taken on line 2—2 of Figure 1.

Figure 2 is a cross-sectional view of Figure 1, showing the electron beam 1, focusing anode 9 through a slit in which the beam is passed, and anode 3.

Figure 3:
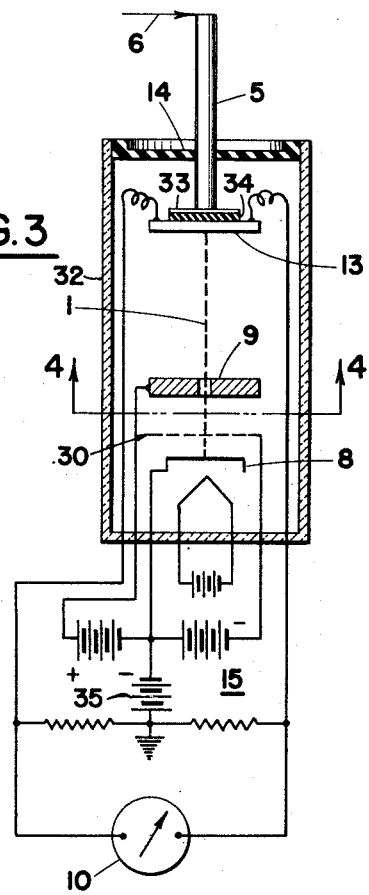
Figure 3 is a tube similar to the one of Figure 1 with a bridge type of indicating circuit.

In Figure 3, the electron beam is directed onto two target electrodes 13, made of a resistance material, which are connected as two parts of a bridge circuit. In this balanced-bridge indicating circuit 15, the system of operation is essentially the same as Figure 1, except any variation now in the intensity of the beam will not affect the voltage recorded by the meter 10.

Figure 4:
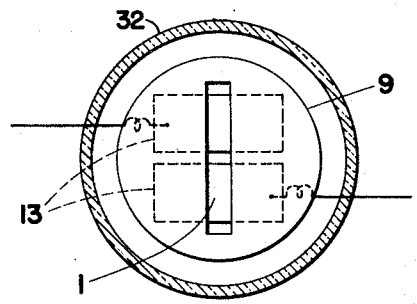
Figure 4 is a sectional view of the tube taken on line 4—4 of Figure 3.

Figure 4 is similar to Figure 2, except that the target electrodes 13 is used in connection with a balanced bridge circuit.

A further modification, in Figure 5, would use target electrodes 11 of a low resistance material but shaped such that as the beam moved over the surface a greater or lesser area would be affected. The voltage change would then vary by a relation controlled by the target electrode shape. This arrangement would cause a non-linear displacement to be recorded as a linear quantity.

In Figure 6, the target electrodes 12, made of high resistance material, are further modified to indicate motion in any direction in a plane and to record its components on separate meters 18, 19 in the x and y directions. As the beam 16 shifts (relative to the target electrode) to the left, the resistance between the beam and point A becomes less and more current flows in the left-hand circuit from plate to cathode reducing the voltage at point C. At the same time the resistance between the beam's point of contact on target electrode and point B would be increased. This reduces the current in the right-hand circuit and raises the voltage at point D. This voltage difference across the meter deflects it to the left. The same circumstances and theory of operation hold true in the vertical plane, giving a reading on the y axis indicator according to the deflection of the beam relative to the plate in the vertical direction.

In Figure 7, the principles and features of Figure 5 and Figure 6 are combined, so that non-linear displacement in both x and y directions can be measured as a linear quantity. This is accomplished by altering the shape of the target electrodes 20 to conform to the known characteristics of the non-linear displacement.

In Figure 8, the metal plate 21 is not insulated from the resistance material 22. This material is applied in non-uniform thickness over the surface of the plate; so that as the beam 23 shifts relative to the plate, the effective resistance between the point of contact of beam with resistance matter and the metal plate will vary, allowing a non-linear displacement to be recorded as a linear quantity.

The invention described herein may be manufactured and used by or for the Government of the United States of America for governmental purposes without the payment of any royalties thereon or therefor.

What is claimed is:

1. A vacuum tube comprising an evacuated envelope having a yieldable diaphragm in one end thereof, an electron beam gun supported with said envelope opposite said yieldable diaphragm, a beam target plate mechanically associated with said yieldable diaphragm for lateral movement relative to an electron beam from said generator, said target plate composed of a high resistance material and electrical connections to said target plate displacement from the point of impingement of the electron stream from said gun.

2. A vacuum tube comprising an evacuated envelope having a yieldable diaphragm in the end thereof, an electron beam gun supported within said envelope opposite said diaphragm, a high resistance beam target plate within said envelope positioned to intercept an electron beam from said gun, means secured to said yieldable wall for supporting said plate, said means also extending exteriorly of said envelope, and an electrical connection to said target plate displaced from the point of interception of said beam on said target plate.

3. A vacuum tube comprising an evacuated envelope having a flexible diaphragm at one end of said envelope, an electron beam gun positioned in said envelope opposite said diaphragm, a beam target electrode in said envelope secured to said flexible diaphragm and adapted to move arcuately in the beam path, and resistance means on said electrode for changing the effective resistance of said target electrode for measuring arcuate displacement of said electrode in said path.

4. A vacuum tube comprising an evacuated envelope having a flexible diaphragm at one end thereof, an electron beam gun positioned in said envelope opposite said flexible diaphragm, a beam target electrode in said envelope secured to a stub mounted on said flexible diaphragm, means exteriorly of said envelope for imparting arcuate displacement to said stub and said electrode, said electrode comprising two or more resistance means adapted to vary the effective resistance of said target electrode as a function of the arcuate displacement of said electrode in said beam path.

5. In an electronic tube, a vacuum chamber having a flexible diaphragm as one wall thereof, a movable target structure comprising an externally tiltable supporting rod passing through said flexible diaphragm and a high resistance electrode system within said vacuum chamber carried by and insulated from said supporting rod, an electron gun within said vacuum positioned to direct an electron stream toward the center of said electrode system when said system is in a normal position and electrical connection to said high resistance electrode system displaced from the center of said high resistance electrode, whereby movement of said tiltable rod changes the distance from the point of impingement of said electron stream to said electrical connection and thereby varies the effective resistance of the electrode system.

6. The device as claimed in claim 5 in which a plurality of high resistance electrodes each having an electrical connection thereto and angularly disposed relative to each other and perpendicular to said electron stream, whereby movement of said probe changes the effective resistance of the electrode system in opposite senses.

7. The device as claimed in claim 5, wherein each of said high resistance electrodes is shaped to cause a non-linear variation in resistance with respect to movement of the supporting rod.

PAUL D. HESS.

REFERENCES CITED

The following references are of record in the file of this patent:

UNITED STATES PATENTS

| Number | Name | Date |
| --- | --- | --- |
| 2,025,461 | Leonard | Dec. 24, 1935 |
| 2,142,857 | McArthur | Jan. 3, 1939 |
| 2,165,981 | Sampson | July 11, 1939 |
| 2,348,177 | Keeler | May 2, 1944 |
| 2,406,982 | Zworykin et al. | Sept. 3, 1946 |

Certificate of Correction

Patent No. 2,527,550 October 31, 1950

PAUL D. HESS

It is hereby certified that error appears in the printed specification of the above numbered patent requiring correction as follows:

Column 3, line 69, for the word "displacement" read *displaced*; and that the said Letters Patent should be read as corrected above, so that the same may conform to the record of the case in the Patent Office.

Signed and sealed this 1st day of May, A. D. 1951.

[SEAL]

THOMAS F. MURPHY,
*Assistant Commissioner of Patents.*